United States Patent [19]

Kōmatsu et al.

[11] Patent Number: 4,789,417
[45] Date of Patent: Dec. 6, 1988

[54] VEHICLE WINDOWPANE MOUNTING SYSTEM

[75] Inventors: Masanobu Komatsu; Takashi Senba; Hisao Miyahara; Kunzi Kimura; Shunji Sakamoto, all of Hiroshima, Japan

[73] Assignee: Mazda Motor Corporation, Japan

[21] Appl. No.: 923,228

[22] Filed: Oct. 27, 1986

[30] Foreign Application Priority Data

Oct. 29, 1985 [JP] Japan .............................. 60-242503
Oct. 30, 1985 [JP] Japan .............................. 60-243625

[51] Int. Cl.$^4$ ............................................. B05B 15/10
[52] U.S. Cl. .................................... 156/356; 29/426.3; 29/714; 29/791; 29/824; 156/364; 156/575; 901/7
[58] Field of Search ............... 156/362, 364, 356, 71, 156/574, 575; 29/426.3, 430, 703, 705, 709, 711, 712, 714, 720, 721, 791, 822, 823, 824; 901/6, 7

[56] References Cited

U.S. PATENT DOCUMENTS 4,453,303  6/1984  Leddet ................................ 29/407
4,564,410  1/1986  Clitheros et al. ................... 156/356
4,683,651  8/1987  Taketani et al. ................... 29/824

FOREIGN PATENT DOCUMENTS 58-196095  6/1983  Japan .
59-96072   6/1984  Japan .

Primary Examiner—Michael W. Ball
Assistant Examiner—David Herb
Attorney, Agent, or Firm—Gerald J. Ferguson, Jr.

[57] ABSTRACT

A windowpane mounting system for mounting a windowpane on a vehicle body comprises a vehicle body conveyor for intermittently feeding the vehicle body, and a windowpane mounting robot for mounting a windowpane on the vehicle body at a windowpane mounting station. The windowpane mounting robot is arranged to be movable between a first mounting position for mounting one of the windowpanes for the windshield and the rear window and a second mounting position for mounting the other windowpane, the first mounting position being further than the second mounting position from a windowpane supply station at which the windowpane mounting robot receives the windowpanes, and is arranged to perform a mounting operation at the first mounting position in response to the feeding of the vehicle body to said windowpane mounting station by the vehicle body conveyor.

6 Claims, 8 Drawing Sheets

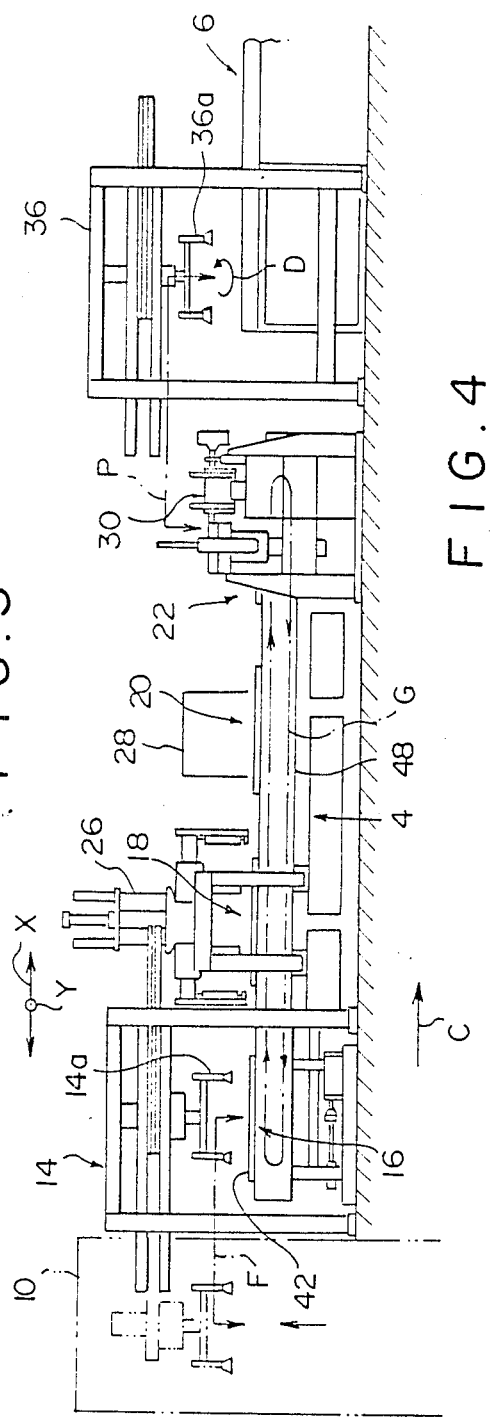
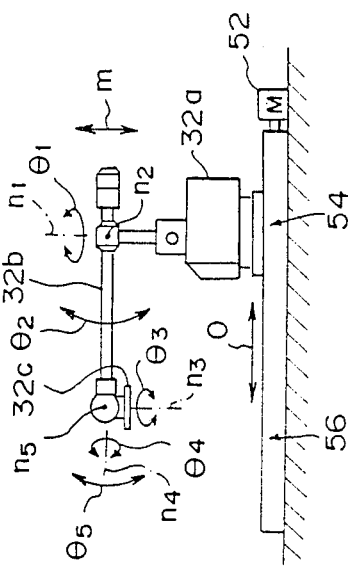
FIG. 3
FIG. 4

VEHICLE WINDOWPANE MOUNTING SYSTEM

BACKGROUND OF THE INVENTION

1. Field of the Invention

This invention relates to a system for mounting a windowpane on a vehicle body.

1. Description of the Prior Art

A windowpane may be mounted on a vehicle body by a conveying-mounting line which is arranged to perform required pretreatments (e.g., application of adhesive to the windowpane in the case of a window in which the windowpane is bonded to the vehicle body by adhesive such as urethane) while conveying a windowpane and subsequently attach the windowpane to the vehicle body by means of a mounting robot.

In this case, from the viewpoint of the manufacturing cost, use of space and the like, it is preferred that both the windshield and the rear window be mounted by a single mounting robot. Further, it is preferred that the single mounting robot be small in size for the same reason. Furthermore, it is preferred that both the windshield and the rear window can be mounted in the shortest possible time. Otherwise, since the vehicle body is held in the windowpane mounting position until mounting of both the windshield and the rear window is completed, the conveying speed of the vehicle body is slowed.

A robot for mounting a windowpane on a vehicle body has been known as disclosed in Japanese Unexamined Utility Model Publication No. 58(1983)-196095 and U.S. Pat. No. 4,453,303.

SUMMARY OF THE INVENTION

In view of the foregoing observations and description, the primary object of the present invention is to provide a windowpane mounting system for a vehicle in which both the windowpane for the windshield and the windowpane for the rear window can be quickly mounted on the vehicle body by a single mounting robot which is relatively small in size.

The windowpane mounting system for mounting a windowpane on a vehicle body in accordance with the present invention comprises a vehicle body conveyor means for intermittently feeding the vehicle body, and a windowpane mounting robot for mounting a windowpane on the vehicle body at a windowpane mounting station. The windowpane mounting robot is arranged to be movable between a first mounting position for mounting one of the windowpanes for the windshield and the rear window and a second mounting position for mounting the other windowpane, the first mounting position being further than the second mounting position from a windowpane supply station at which the windowpane mounting robot receives the windowpanes, and is arranged to perform mounting operation at the first mounting position in response to the feeding of the vehicle body to said windowpane mounting station by the vehicle body conveyor means.

With this arrangement, both the windowpanes for the windshield and the rear window can be mounted on the vehicle by a single mounting robot. At the same time, the length of the arm and the moving area of the arm of the robot can be minimized by moving the single robot between the two mounting positions as compared with the case in which the robot is in a stationary position and performs mounting of the windowpanes for the windshield and the rear window by rotating the arm, whereby the mounting robot can be small in size. Further, by arranging for the mounting robot to perform mounting operation first at the first mounting station which is disposed further from the windowpane supply station, the mounting robot can take the windowpane to be mounted on the vehicle body at the first mounting position and carry it to the first mounting position while the vehicle body is being fed to the windowpane mounting station. Accordingly, the time required for preparation for mounting the windowpane can be saved, thereby shortening the overall time required for mounting of the windowpanes.

BRIEF DESCRIPTION OF THE DRAWINGS

FIG. 3 is a front view showing in detail a part of the windowpane mounting system, FIG. 4 is a front view of the windowpane mounting robot employed in the windowpane mounting system.

DESCRIPTION OF THE PREFERRED EMBODIMENT

Figure 1:
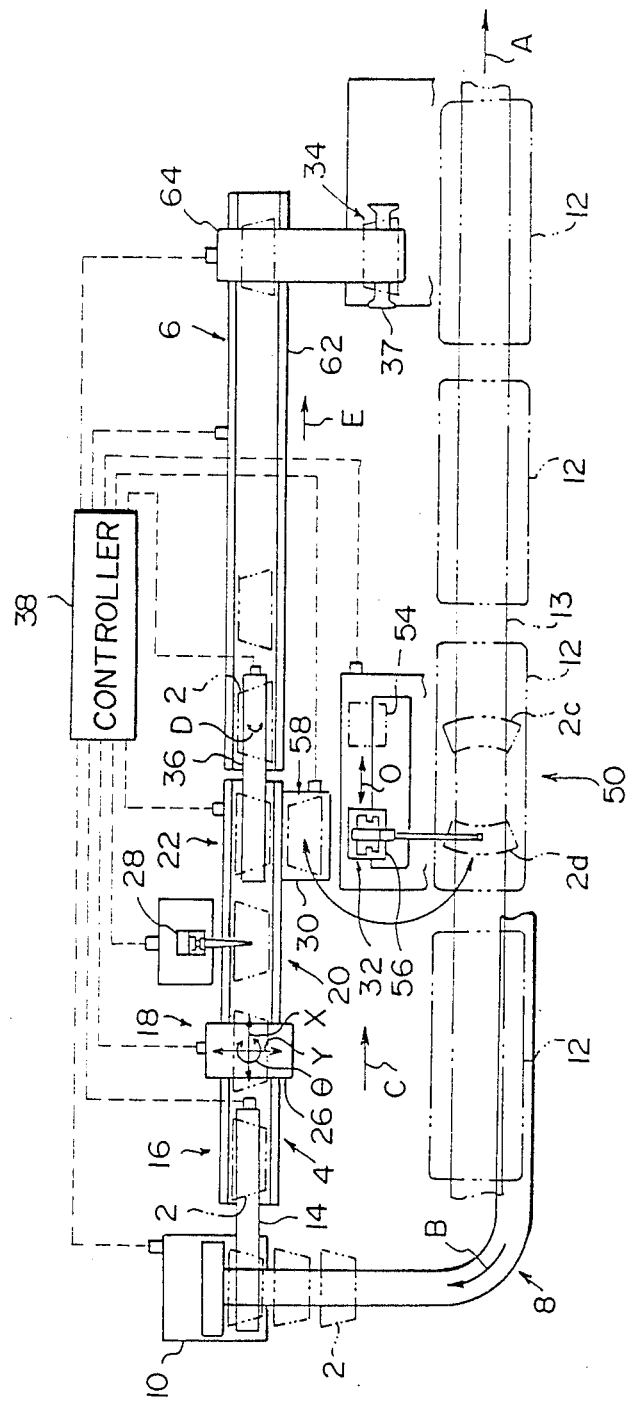
FIG. 1 is a schematic plan view of a windowpane mounting system in accordance with an embodiment of the present invention.

In FIG. 1, a windowpane mounting system in accordance with an embodiment of the present invention comprises a first windowpane conveyor 4 and a second windowpane conveyor 6. To the first windowpane conveyor 4, a preliminary conveyor 8 feeds windowpanes 2 for the windshield and the rear window with bonding type windowpanes (to be attached to the vehicle body by adhesive such as urethane) mingling with seal rubber type windowpanes (to be attached to the vehicle body by way of a seal rubber such as a weatherstrip).

The preliminary conveyor 8 is disposed on the first level, and the first and second windowpane conveyors 4 and 6 are disposed on the second level. The windowpane 2 is transferred from the preliminary conveyor 8 to the first windowpane conveyor 4 by a vertical conveyor 10. Further, there is disposed a body conveyor 13 for intermittently feeding vehicle bodies 12 in the direction of arrow A in parallel to the first and second windowpane conveyors 4 and 6.

The windowpane 2 is fed by the preliminary conveyor 8 in the direction of arrow B, and in the case of a bonding type windowpane, primer is applied to the windowpane 2 by a coating robot (not shown) while being fed by the preliminary conveyor 8. Seal rubber type windowpanes 2 are placed on the preliminary conveyor 8, by an operator for instance, between the bonding type windowpanes 2 in a predetermined position downstream of the coating robot.

The bonding type windowpanes and the seal rubber type windowpanes are fed below the vertical conveyor 10 by the preliminary conveyor 8, and then lifted to the second level by the vertical conveyor 10. From the vertical conveyor 10, the windowpanes 2 are transferred to the first windowpane conveyor 4 by a first transfer device 14 provided between the vertical conveyor 10 and the first windowpane conveyor 4.

A shape correction station 16, a locating station 18, an adhesive application station 20 and an inverting station 22 are arranged along the first windowpane conveyor 4, and the first windowpane conveyor 4 intermittently feeds the windowpanes 2 successively to these stations.

Of the windowpanes 2 transferred to the first windowpane conveyor 4, the bonding type windowpanes are fixed to a support table (not shown in FIG. 1 and to be described later) under vacuum at the shape correction station 16 and are corrected to the regular shape. At the locating station 18, the bonding type windowpanes 2 are adjusted in X, Y and $\frac{1}{4}$ directions by a locating device 26 to be positioned in a predetermined position. At the adhesive application station 20 adhesive such as urethane is applied to the windowpane 2 by an adhesive applicating device 28 provided along the first windowpane conveyor 4, and at the inverting station 22, the windowpane 2 is inverted by an inverting device 30 so that the surface to which the adhesive has been applied is directed downward. Then the windowpane 2 is automatically mounted on the vehicle body 12 fed in intermittent fashion in parallel to the first windowpane conveyor 4 by a windowpane mounting robot 32 disposed between the first windowpane conveyor 4 and the body conveyor 13.

On the other hand, of the windowpanes transferred to the first windowpane conveyor 4, the rubber seal type windowpanes are intermittently fed to the inverting station 22 through the shape correction station 16, the locating station 18 and the adhesive application station 20 without being subjected to the operation and then delivered to the second windowpane conveyor 6 from the inverting station 22 without being inverted.

The second windowpane conveyor 6 is connected to the downstream end of the first windowpane conveyor 4 and feeds the seal rubber type windowpanes 2 delivered from the first windowpane conveyor 4 to a windowpane mounting station 34. More specifically, the second windowpane conveyor 6 comprises a conveyor body 62 connected to the first windowpane conveyor 4 by way of a second transfer device 36 and a third transfer device 64 connecting the conveyor body 62 and the windowpane mounting station 34. The second transfer device 36 transfers the seal rubber type windowpane 2 fed to the inverting station 22 of the first windowpane conveyor 4 to the conveyor body 62 rotating the windowpane by 180° in the direction of arrow D if required. The windowpane 2 transferred to the conveyor body 62 is fed in the direction of arrow E by the conveyor body 62 and transferred to the windowpane mounting station 34 by the third transfer device 64. The seal rubber type windowpane 2 thus fed to the windowpane mounting station 34 is placed on a mounting jig 37 and is manually mounted on the vehicle body 12 by use of the mounting jig 37.

When the windowpane mounting robot 32 fails, the system of this embodiment is operated as follows.

When the windowpane mounting robot 32 fails, the bonding type windowpanes 2 cannot be mounted on the vehicle body 12 by the mounting robot 32. In this case, the bonding type windowpanes 2 applied with adhesive at the adhesive application station 28 are delivered to the second windowpane conveyor 6 by the second transfer device 36 without being inverted at the inverting station 22 and then fed to the windowpane mounting station 34. The bonding type windowpanes 2 fed to the windowpane mounting station 34 may be manually mounted on the vehicle body 12.

The vertical conveyor 10, the first transfer device 14, the first windowpane conveyor 4, the second windowpane conveyor 6, the locating device 26, the adhesive applicating device 28, the inverting device 30, the windowpane mounting robot 32, the second transfer device 36, and the second windowpane conveyor 6 (including the conveyor body 62 and the third transfer device 64) operate under the control of a controller 38. Further, the body conveyor 13 is also controlled by the controller 38. If desired, these devices may be separately controlled.

Transfer by the first and second windowpane conveyors 4 and 6 will be described in more detail with reference to FIGS. 2 to 9, hereinbelow.

As described above, the windowpanes 2 are lifted by the vertical conveyor 10 with the bonding type windowpanes and the seal rubber type windowpanes mingling together, and are placed on a support table 42 (corresponding to the support table described above) at the shape correction station 16 by a suction device 14a of the first transfer device 14 which is movable in the direction of arrow F as shown in FIG. 3.

The first windowpane conveyor 4 comprises, as shown in FIG. 3, a pair of guide rails 48 and a plurality of (eight in this particular embodiment only four of which are visible in FIG. 3) support tables 42 movable along the guide rails 48 with the windowpane 2 supported thereon. The support tables 42 are intermittently fed in endless fashion in the direction of arrow G by means of a chain, cylinder or the like. Each support table 42 is successively fed to the shape correction station 16, the locating station 18, the adhesive application station 20 and the inverting station 22, is stopped at each of the stations for a predetermined time and is subjected to the desired operation at each station.

Figure 5:
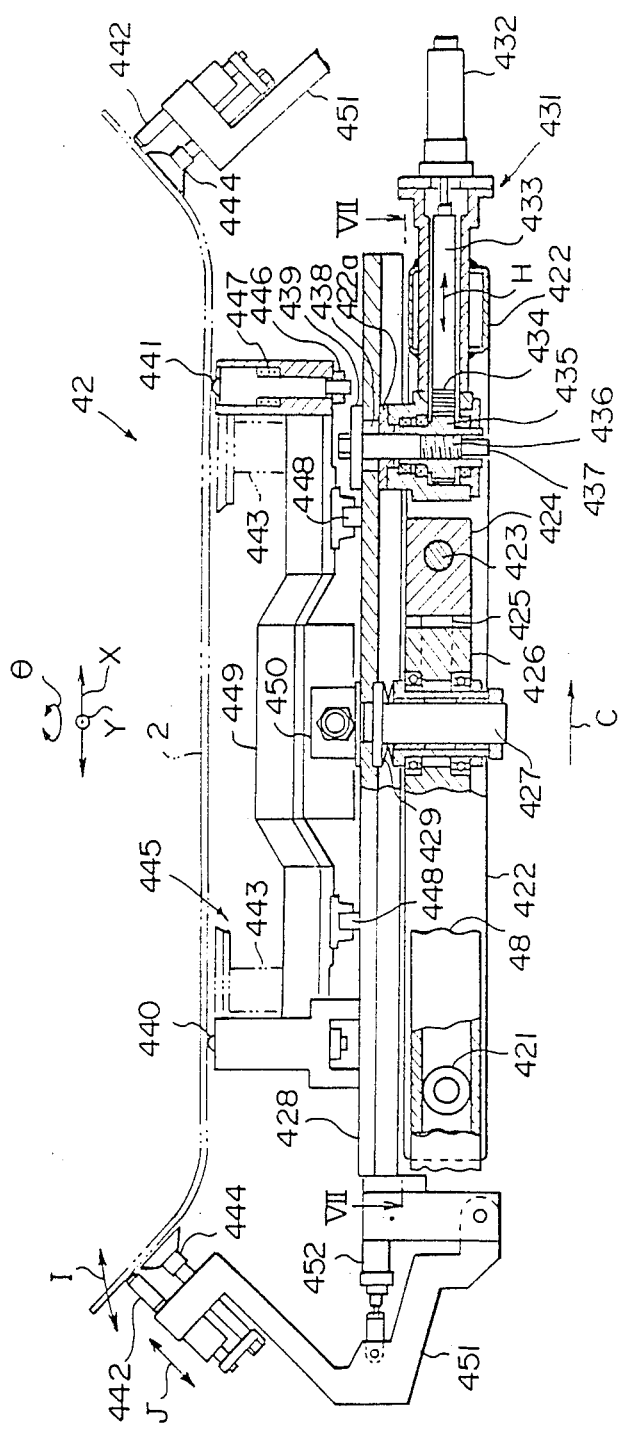
FIG. 5 is a side view partly in cross section showing the windowpane support table employed in the mounting system.
Figure 7:
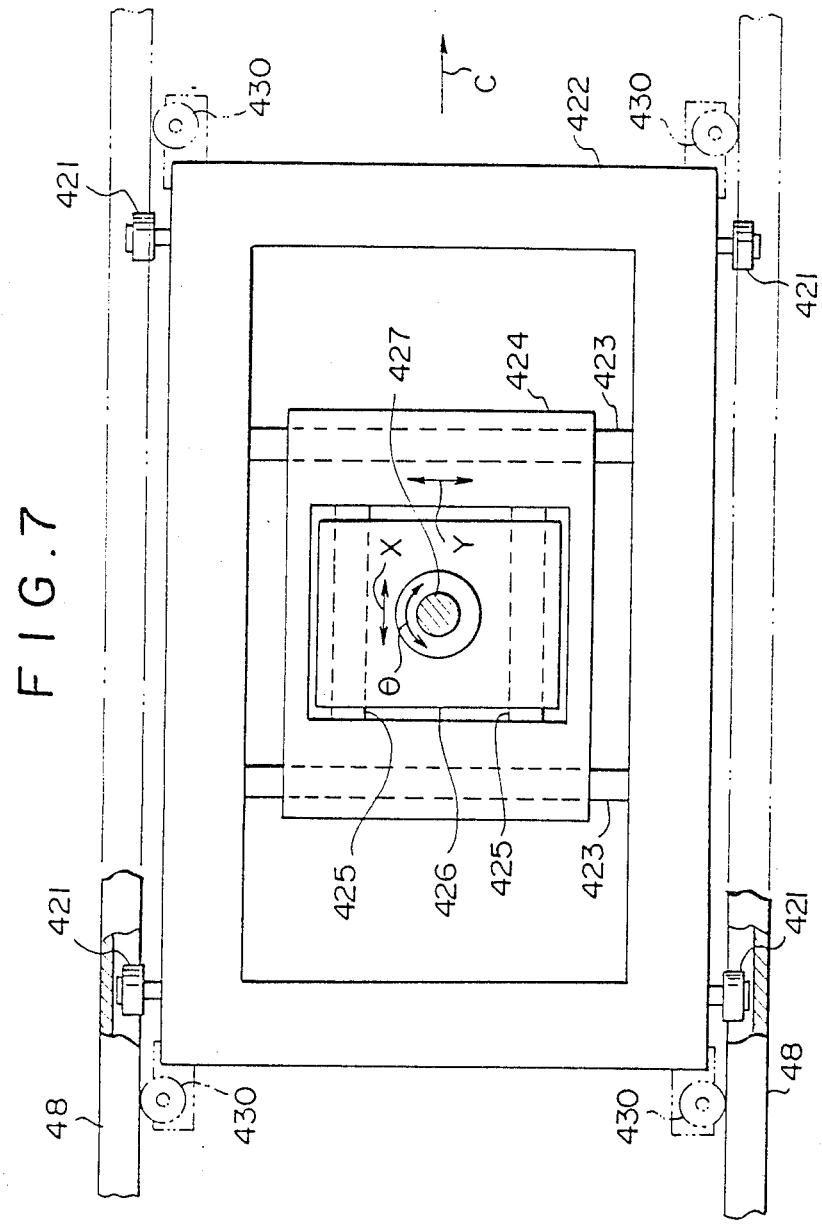
FIG. 7 is a cross-sectional view taken along line VII—VII in FIG. 5.

As clearly shown in FIGS. 5 and 7, each support table 42 comprises a hollow base 422 supported on the guide rails 48 by way of rollers 421, a hollow Y-direction slider 424 which is engaged with a pair of guide rods 423 extending in the Y-direction through the hollow base 422 and is slidable along the guide rods 423 in the Y-direction, an X-direction slider 426 which is engaged with a pair of guide rods 425 extending in the X-direction through the hollow Y-direction slider 424 and is slidable along the guide rods 425 in the X-direction, a rotary shaft 427 engaged with the X-direction slider 426 at the center of the slider 426 for rotation in the θ-direction, and a pallet 428 fixed to the top of the rotary shaft 427. As shown in FIG. 5, an annular plate spring 429 is disposed between the rotary shaft 427 and the bearing portion of the X-direction slider 426 to urge upward the pallet 428 by way of the rotary shaft 427 under a predetermined force. Further, the base 422 may be provided with additional rollers 430, if desired, as shown by the chained line in FIG. 7.

Figure 6:
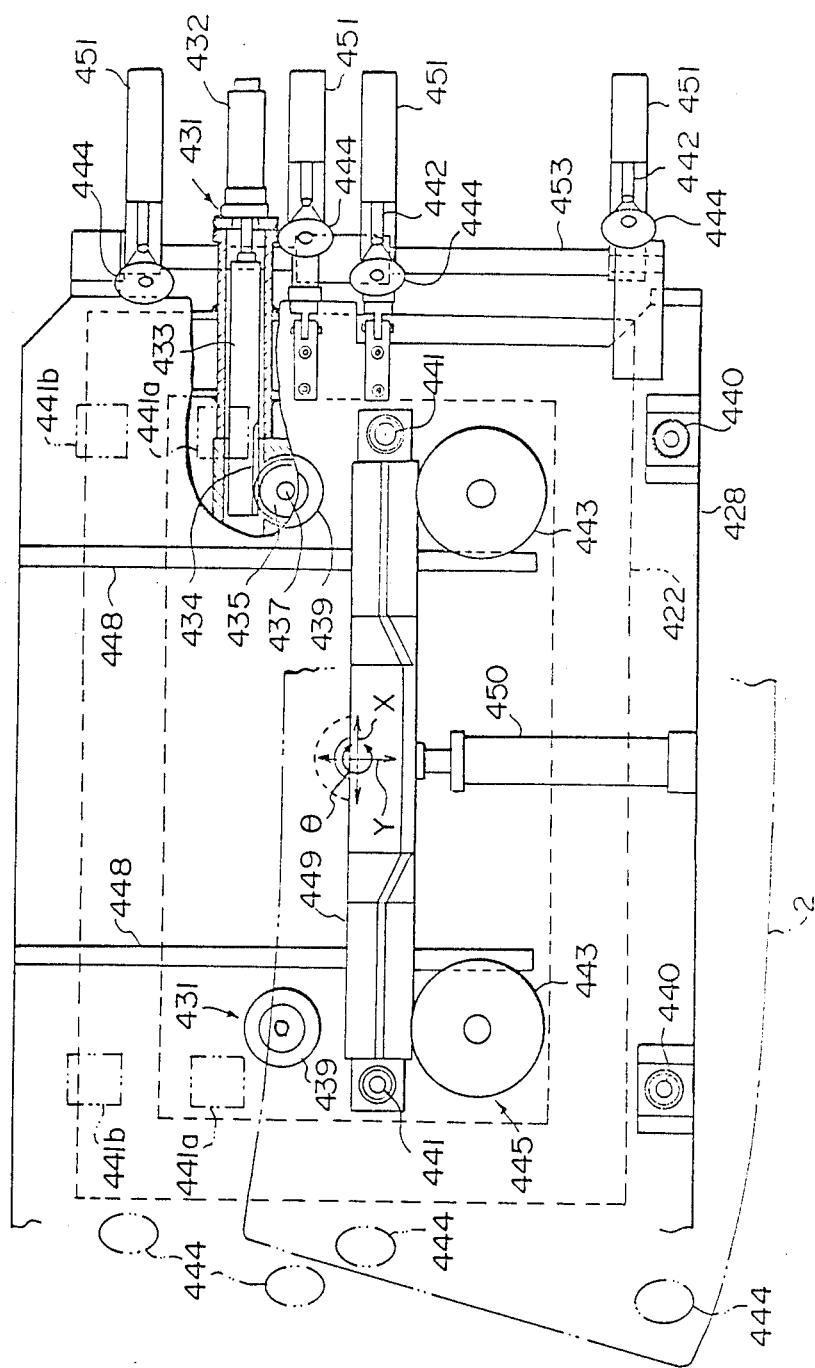
FIG. 6 is a plan view partly abbreviated of the windowpane support table.

The base 422 is provided with a pair of clamping devices 431 for clamping the pallet 428 as shown in FIGS. 5 and 6 (not shown in FIG. 7). Since the pallet 428 is rotatable relative to the X-direction slider 426 in the θ-direction, the X-direction slider 426 is slidable relative to the Y-direction slider 424 in the X-direction and the Y-direction slider 424 is slidable relative to the base 422, the pallet 428 is movable relative to the base 24 in the X-direction, Y-direction and θ-direction. The clamping devices 431 are for clamping the pallet 428 to the base 422 and each comprises a rod 43 driven by a cylinder 432 in the direction of arrow H, a tubular pinion 435 in mesh with a rack formed on the free end portion of the rod 433, and a clamp member 437 having on its outer surface a male thread portion 436 in mesh with a female thread portion formed in the inner surface of the pinion 435. The clamp member 437 projects upward through a hole 438 formed in the pallet 428, and a pressure plate 439 for pressing the pallet 428 is provided on the upper end portion of the clamp member 437 projecting above the pallet 428. By moving the rod 433 back and forth in the direction of the arrow H, the pressure plate 439 is moved up and down. That is, by moving downward the pressure plate 439 against the pallet 428 to press the pallet 428 between the pressure plate 439 and a support portion 422a integrally connected to the base 422, the pallet 428 is clamped to the base 422, and by moving upward the pressure plate 439, the pallet 428 is released from the base 422.

On the pallet 428 is provided a shape correction device 445 comprising a plurality of locating members 440, 441 and 442 having abutment faces and arranged to conform to the regular shape of the windowpane 2, and suction devices 443 and 444 to bring the windowpane 2 into abutment against the locating members 440, 441 and 442.

The windowpane 2 is placed on the pallet 428 and is fed to the adhesive application station 20 where adhesive is applied to the windowpane 2 by the adhesive applicating device 28. Since the adhesive applicating device 28 is arranged to properly apply adhesive to the windowpane 2 provided that the shape of the windowpane 2 is regular, proper application of adhesive cannot be expected if the windowpane 2 is irregular in shape. For example, the adhesive layer can fluctuate in thickness. Accordingly, it is preferred that the shape of the windowpane 2 be corrected to the regular shape before application of adhesive. For this purpose, the shape correction device 445 is provided.

The windowpane 2 transferred to the first windowpane conveyor 4 from the first transfer device 14 is first placed on the shape correction device 445 of the support table 42 at the shape correction station 16, more specifically, on the locating members 440 to 442, and is then drawn by the suction devices 443 and 442 to be brought positively into abutment against the locating members 440 to 442, whereby the shape of the windowpane 2 is corrected to the regular shape.

In the locating members 440 to 442, the locating members 440 and 441 are adapted to abut against the lower surface of the flat portion of the windowpane 2, and the locating members 442 are adapted to abut against the lower surfaces of the curved portions on opposite sides of the windowpane 2 as clearly shown in FIGS. 5 and 6. The locating members 440 are stationary, whereas the locating members 441 are movable in the Y-direction. Each of the locating members 440 and 441 comprises a ball member held in place by a stop 446 and a spring 447. The movable locating members 441 are provided on a movable bar 449 which is movable along a pair of guide rails 448 extending in the Y-direction and are moved in the Y-direction by driving the movable bar 449 by a cylinder 450 to positions shown by chained lines 441a and 441b in FIG. 6. Each of the locating members 442 for the curved portion comprises a pin member and is formed on an arm 451. As shown in FIG. 5, the locating member 442 is driven by a cylinder 452 by way of the arm 451 in the direction of arrow I and is movable in the direction of arrow J relative to the arm 451. Further, the locating member 442 is movable in the Y-direction along a guide bar 453 by way of the arm 451.

The suction devices 443 are for drawing the windowpane 2 by the lower surface of the flat portion thereof, and the suction devices 444 are for drawing the windowpane 2 by the lower surface of the curved portion thereof. Each of the suction devices 443 and 444 comprises a suction cup drawing the windowpane 2 under vacuum force. The suction devices 443 are stationary, whereas the suction devices 444 are provided on the arm 451 together with the locating member 442 to be movable in the directions of the arrows I and J and the Y-direction.

After correction of the shape, the support table 42 is moved to the locating station 18 and the windowpane 2 is positioned in a predetermined position.

At the locating station 18, the windowpane 2 is located in place in order to properly apply adhesive to the windowpane 2 by the automatic adhesive applicating device 28 at the adhesive application station 20.

By locating the windowpane 2 before the windowpane 2 is fed to the adhesive application station 20, the time required to feed the windowpane 2 can be substantially shortened. That is, if location of the windowpane 2 and application of adhesive to the windowpane 2 are both performed at a single station, the windowpane 2 must be stopped at the station for a long time to lengthen the time required to feed the windowpane 2.

Location of the windowpane 2 at the locating station 18 is performed by the support table 42 and the locating device 26 positioned above the support table 42.

Figure 8:
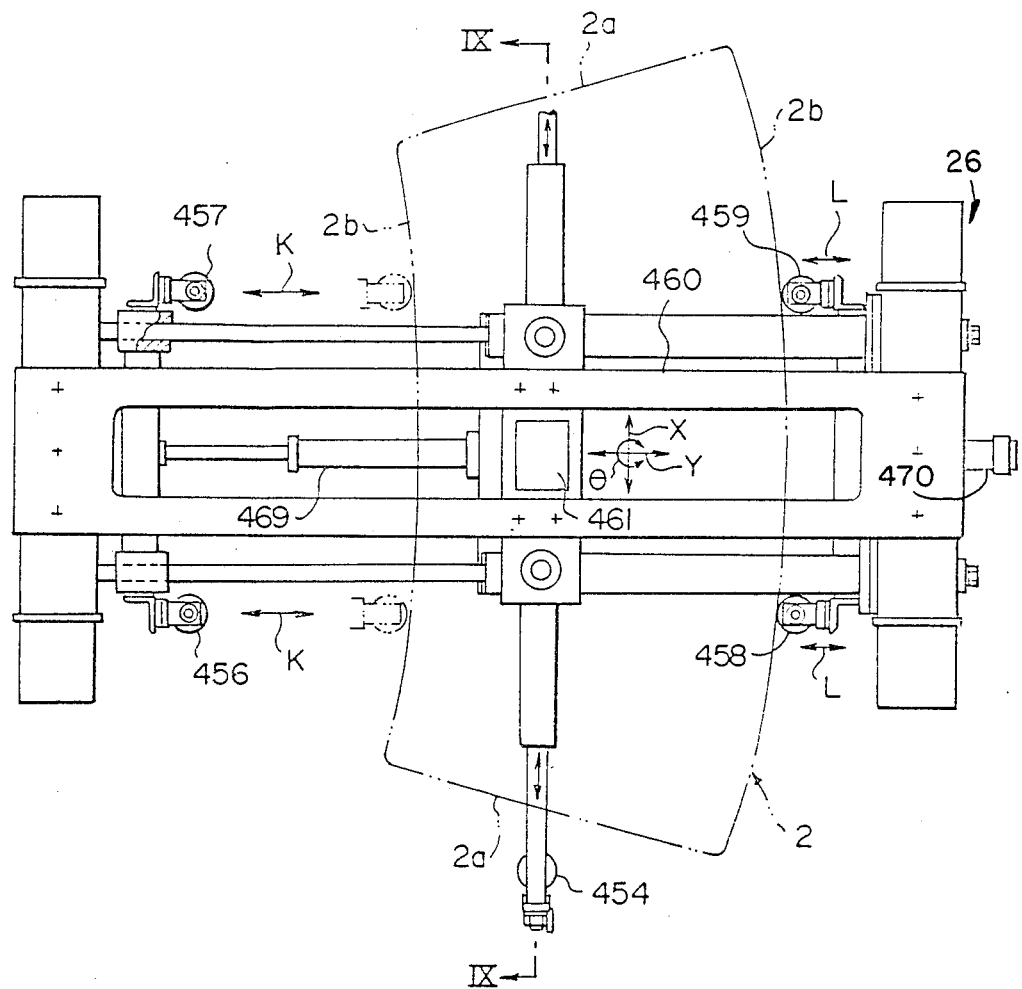
FIG. 8 is a plane view of the locating device employed in the mounting system.
Figure 9:
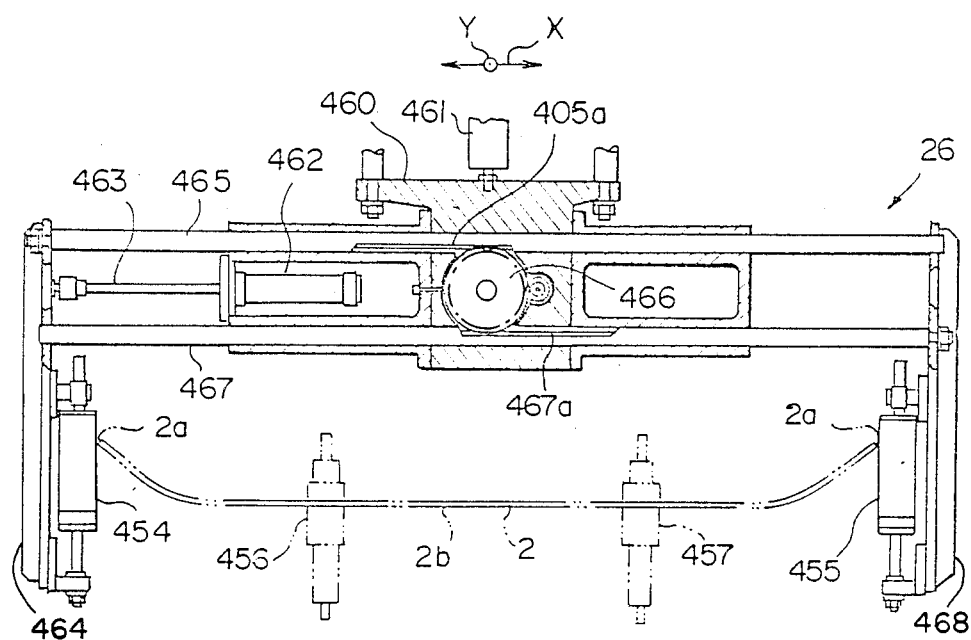
FIG. 9 is a cross-sectional view taken along line XI—XI in FIG. 8.

The locating device 26 comprises, as shown in FIGS. 8 and 9, a pair of Y-direction locating rollers 454 and 455 adapted to abut against opposite ends 2a of the windowpane 2 to locate the windowpane 2 in the X-direction, a pair of Y-direction locating rollers 456 and 457 adapted to abut against one side of the windowpane 2 and a pair of Y-direction locating rollers 458 and 459 adapted to abut against the other side of the windowpane 2, the Y-direction locating rollers 456 and 457 and the Y-direction locating rollers 458 and 459 being adapted to sandwich the windowpane 2 from opposite sides thereof to locate the windowpane 2 in the X-direction. The rollers 454 to 459 are supported by way of a base 460 which is moved up and down by a cylinder 461.

The X-direction locating rollers 454 and 455 are movable away from and toward each other in the X-direction, and the Y-direction locating rollers 456 to 459 are movable away from and toward each other in the Y-direction. The X-direction locating rollers 454 and 455 are moved away from and toward each other by a rod 463 driven by a cylinder 462 which is fixedly mounted on the base 460 as shown in FIG. 9. That is, when the rod 463 is moved leftward as seen in FIG. 9, the roller 454 is moved leftward by way of a bracket 464 and at the same time, an upper rod 465 is moved leftward. The upper rod 465 has a rack portion 405a in mesh with a pinion 466 which is also in mesh with a rack portion 467a formed on a lower rod 467. Thus, when the rod 463 is moved leftward, the lower rod 467 is moved rightward to move rightward the roller 455 by way of a bracket 468. Thus, the rollers 454 and 455 are respectively moved leftward and rightward to be moved away from each other in response to left movement of the rod 463. In a similar manner, the rollers 454 and 455 are respectively moved rightward and leftward to be moved toward each other in response to right movement of the rod 463. The Y-direction locating rollers 456 to 459 are moved away from and toward each other by means of cylinders 469 and 470 which are fixedly mounted on the base 460 as shown in FIG. 8. That is, the rollers 456 and 457 are moved back and forth in the Y-direction by the cylinder 469 as indicated by arrow K, and the rollers 458 and 459 are moved back and forth in the Y-direction by the cylinder 470 as indicated by arrow L.

The windowpane 2 is located in the following manner by the locating device 26 with the arrangement described above. First, the rollers 454 to 459 are moved away from the corresponding rollers in the X-direction or Y-direction and then lifted upward by the cylinder 461. Thereafter, the support table 42 is moved to the locating station 18 below the locating device 26. As described above, the windowpane 2 is fixed to the shape correction device 445 on the pallet 428, and the pallet 428 and accordingly the windowpane 2 thereon are movable in the X-direction, Y-direction and $\theta$-direction. In this state, the rollers 454 to 459 of the locating device 26 are moved downward to the position of the windowpane 2 as shown in FIG. 9. Subsequently, the X-direction locating rollers 454 and 455 are moved toward each other to sandwich therebetween the windowpane 2 in the X-direction, and the Y-direction locating rollers 456 to 459 are moved toward each other to sandwich therebetween the windowpane 2 in the Y-direction. The windowpane 2 is thus located both in the X-direction and the Y-direction, and by locating the windowpane 2 in both the X-direction and Y-direction, it can be automatically located in the $\theta$-direction. After the windowpane 2 is thus located, the pallet 428 is clamped to the base 422 by the clamping device 431.

After the pallet 428 is clamped, the rollers 454 to 459 are moved away from each other and moved upward. Then the support table 42 is fed to the adhesive application station 20 and adhesive is applied to the windowpane 2. Application of adhesive is automatically performed by the adhesive applicating device 28 in accordance with a pattern stored therein. Since the windowpane 2 has been corrected in shape at the shape correction station 16 and has been located in place in the locating station 18, adhesive can be applied properly, smoothly and quickly.

Figure 2:
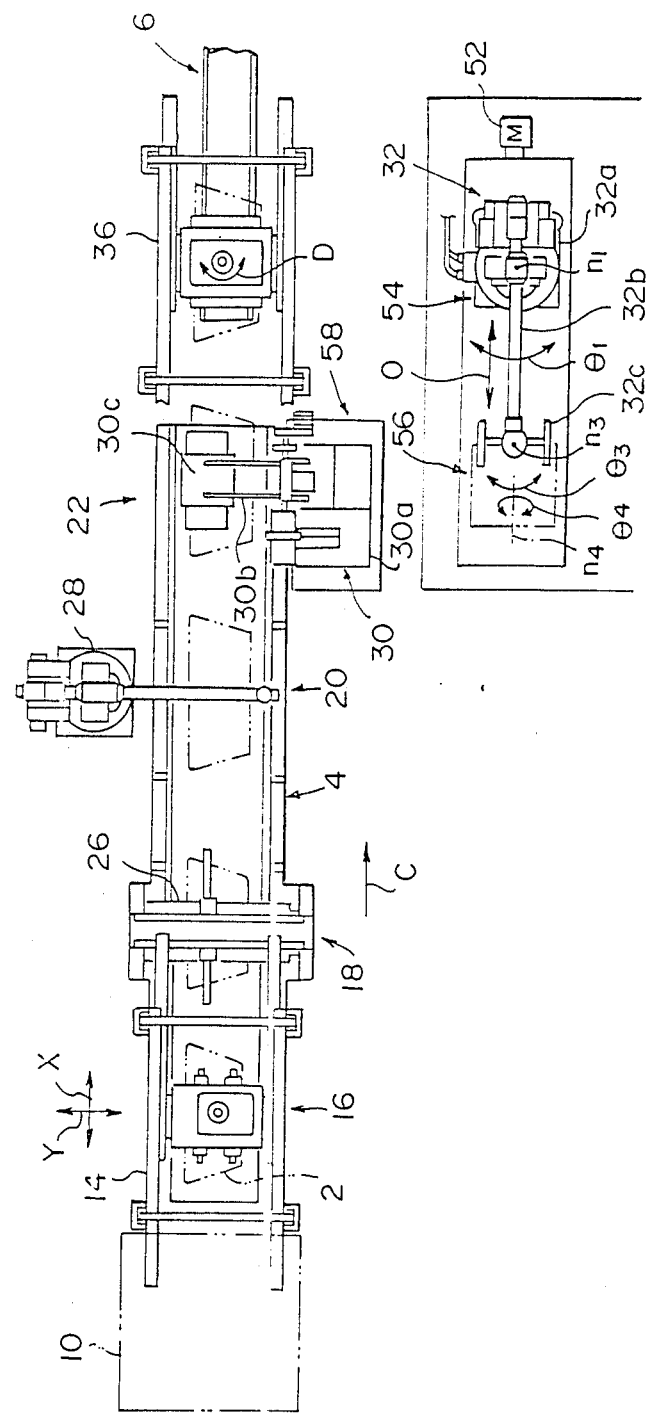
FIG. 2 is a plane view showing in detail a part of the windowpane mounting system.

After completion of application of adhesive, the support table 42 is fed to the inverting station 22, and at the inverting station 22 the windowpane 2 is released from the shape correction device 445. Then the windowpane 2 is inverted by the inverting device 30. As best shown in FIG. 2, the inverting device 30 comprises an arm 30$b$ rotatable about a shaft 30$a$ and a windowpane catching portion 30$c$ on the free end of the arm 30$b$. By rotating the arm 30$b$ about the shaft 30$a$ with the windowpane catching portion 30$c$ catching the windowpane 2 on the support table 42 at the inverting station 22, the windowpane 2 is inverted so that the surface applied with adhesive is directed downward.

Then the inverted windowpane 2 is automatically mounted on the vehicle body 12 by the windowpane mounting robot 32. As described above, the mounting robot 32 mounts both the windowpanes for the windshield and the rear window while the vehicle body 12 intermittently fed to a windowpane mounting station 50 set on the body conveyor 13 is stopped at the station 50.

The windowpane mounting robot 32 comprises, as shown in FIGS. 1, 2 and 4, a base 32$a$, an arm member 32$b$ mounted on the base 32$a$ for up-and-down movement in the direction shown by arrow m, rotation about a vertical axis $n_1$ in the direction shown by arrow $\theta_1$ and rotation about a horizontal axis $n_2$ in the direction shown by arrow $\theta_2$, and a windowpane catching portion 32$c$ mounted on the free end of the arm member 32$b$ for rotation about a vertical axis $n_3$ in the direction shown by arrow $\theta_3$, rotation about a horizontal axis $n_4$ in the direction shown by arrow $\theta_4$ and rotation about a horizontal axis $n_5$ in the direction shown by arrow $\theta_5$. Further, the whole windowpane mounting robot 32 is movable between a windshield mounting position 54 and a rear window mounting position 56 driven by a driving mechanism including a driving motor 52.

The windowpane 2 applied with adhesive at the adhesive application station 20 and inverted at the inverting station 22 is fed to a windowpane supply station 58 at which the windowpane 2 is held in the inverted state. In this particular embodiment, the rear window mounting position 56 is nearer to the windowpane supply station 58 than the windshield mounting position 54, and the mounting robot 32 first mounts the windowpane 2$c$ for the windshield, and subsequently mounts the windowpane 2$d$ for the rear window.

That is, the mounting robot 32 is first positioned at the rear window mounting position 56 and catches the windowpane 2$c$ for the windshield by operation of the arm member 32$b$ and the catching portion 32$c$, and then is moved, carrying the windowpane 2$c$, to the windshield mounting position 54 which is further from the windowpane supply station 58 than the rear window mounting position 56. When the vehicle body 12 is brought into a windowpane mounting station 50 on the body conveyor 8 and stopped, the mounting robot 32 mounts the windowpane 2$c$ for the windshield on the vehicle body 12 by operation of the arm member 32$b$ and the windowpane catching portion 32$c$. During mounting of the windowpane 2$c$ for the windshield, the windowpane 2$d$ for the rear window is applied with adhesive and is inverted. After completion of mounting of the windowpane 2$c$ for the windshield, the mounting robot 32 returns to the rear window mounting position 56 nearer to the windowpane supply station 58, and then mounts the windowpane 2$d$ for the rear window (which has been fed to the windowpane supply station 58) on the vehicle body 12. After the windowpane 2$c$ for the windshield and the windowpane 2$d$ for the rear window has been thus mounted on the vehicle 12, the vehicle body 12 begins to be fed in the direction of the arrow A, and at the same time, the mounting robot 32 takes another windowpane 2$c$ for the windshield of the next vehicle body 12 which has been fed to the windowpane supply station 58 and is moved to the windshield mounting position 54 together with the windowpane 2$c$. Thus, the steps as described are repeated.

By arranging the windowpane mounting robot to be movable between the windshield mounting position 54 and the rear window mounting position 56 and to effect mounting operation first at the windowpane mounting station which is disposed further from the windowpane supply station 58 (the windshield mounting position 54 in this particular embodiment), the mounting robot 32 can take the windowpane to be mounted on the vehicle body 12 at the mounting position 54 further from the windowpane supply station 58 (the windowpane 2c for the windshield) and carry it to the mounting position 54 while the vehicle body 12 is being fed to the station. Accordingly, the time required for preparation for mounting the windowpane 2c can be saved, thereby shortening the overall time required for mounting of the windowpanes.

In the case that the seal rubber type windowpane 2 is transferred to the first windowpane conveyor 4, though the windowpane 2 is placed on the support table 42 at the shape correction station 16 and fed to the inverting station 22 through the locating station 18 and the adhesive application station 20 carried by the support table 42, the windowpane 2 is passed through each station without being subjected to the operation. Then the seal rubber type windowpane 2 is transferred from the inverting station 22 to the second windowpane conveyor 6 by the second transfer device 36.

As shown in FIG. 3, the second transfer device 36 has a suction device 36a similar to that of the first transfer device 14. The suction device 36a is moved in the direction of arrow P and catches the windowpane 2 at the inverting station 22 and then transfers the windowpane 2 to the second 25 windowpane conveyor 6 after rotating it by 180°.

The seal rubber type windowpane 2 transferred to the second windowpane conveyor 6 is fed to the windowpane mounting station 34 by the second windowpane conveyor 6 or the conveyor body 62 and the third transfer device 64 in the manner described above, and is placed on a windowpane mounting jig 37 and is fixed to the jig 37 under suction force. The third transfer device 64 is of the same structure as the first transfer device 14, and transfers the windowpane 2 from the conveyor body 62 to the windowpane mounting jig 37. Then, the seal rubber type windowpane 2 is mounted on the vehicle body 12 by the operator with the aid of the jig 37.

In case of failure of the windowpane mounting robot 32 or the inverting device 30, the bonding type windowpane is transferred to the second windowpane conveyor 6 (rather than the windowpane supply station 58) without being inverted at the inverting station 22 by the second transfer device 36 in the same manner as the seal rubber type windowpane and then fed to the windowpane mounting station 34 by the second windowpane conveyor 6, where the seal rubber type windowpane is mounted on the vehicle body 12 by the operator, though the seal rubber type windowpane is fed to the windowpane mounting station 34 in the usual manner.

These operations of the windowpane mounting system of this embodiment are effected under the control of the controller 38.

In accordance with the present invention, as can be understood from the description above, both the bonding type windowpane and the seal rubber type windowpane can be efficiently handled by a single windowpane mounting system, and at the same time, mountin9 of the windowpane on the vehicle body can be continued without stopping the system in case of failure of the windowpane mounting robot

We claim:

1. A windowpane mounting system for mounting windowpanes on a vehicle body comprising a vehicle body conveyor means for intermittently feeding the vehicle body, and a windowpane mounting robot for mounting a windowpane on the vehicle body stopped at a windowpane mounting station, said windowpane mounting robot being movable between (a) a first mounting position for mounting one of the windowpanes for the windshield and the rear window and (b) a second mounting position for mounting the other windowpane, the first mounting position being further than the second mounting position from a windowpane supply station at which the windowpane mounting robot receives the windowpanes, and is arranged to perform a mounting operation at the first mounting position in response to the feeding of the vehicle body to said windowpane mounting station by the vehicle body conveyor means; said one of the windowpanes and said other windowpane being fed to the windowpane mounting station mingled with each other by a first windowpane conveyor means, an adhesive application means for applying adhesive on one side of the bonding type windowpane being disposed upstream of said windowpane mounting station, said windowpane mounting robot being adapted to mount only a bonding type windowpane, and a second windowpane conveyor means which is connected to the downstream end of the first windowpane conveyor to normally receive seal rubber type windowpanes from the first windowpane conveyor means and to feed them to a seal-rubber-type-windowpane mounting station, and is adapted to receive the bonding type windowpanes in addition to the seal rubber type windowpanes from the first windowpane conveyor means and feed them to the seal-rubber-type windowpane mounting station.

2. A windowpane mounting system as defined in claim 1 in which said windowpane is of bonding type and is applied with adhesive on one side thereof at an adhesive application station and is inverted at an inverting station by an inverting means so that said one side is directed downward before being fed to the windowpane supply station.

3. A windowpane mounting system as defined in claim 2 in which the windowpane is fed from the adhesive application station to the inverting station with said one side directed upward.

4. A windowpane mounting system as defined in claim 3 in which said windowpane is fed to the inverting station carried by a pallet means having a fixing means for fixing the windowpane to the pallet means.

5. A windowpane mounting system as defined in claim 4 in which said pallet means has a sliding portion movable at least in a horizontal plane and the windowpane is located in place by virtue of the sliding portion before application of adhesive.

6. A windowpane mounting system as defined in claim 5 in which said bonding type windowpane is automatically applied with adhesive by an adhesive application means which applies adhesive in accordance with a pattern stored therein.

* * * * *